(12) United States Patent
Sakai et al.

(10) Patent No.: US 11,362,568 B2
(45) Date of Patent: Jun. 14, 2022

(54) LIQUID COOLING STRUCTURE OF ROTATING ELECTRIC MACHINE

(71) Applicant: MEIDENSHA CORPORATION, Tokyo (JP)

(72) Inventors: Tamotsu Sakai, Yamanashi (JP); Yuya Fujiwara, Hiroshima (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/272,430

(22) PCT Filed: Jun. 20, 2019

(86) PCT No.: PCT/JP2019/024420
§ 371 (c)(1),
(2) Date: Mar. 1, 2021

(87) PCT Pub. No.: WO2020/049831
PCT Pub. Date: Mar. 12, 2020

(65) Prior Publication Data
US 2021/0249932 A1    Aug. 12, 2021

(30) Foreign Application Priority Data

Sep. 5, 2018    (JP) .............................. JP2018-166071

(51) Int. Cl.
*H02K 9/19* (2006.01)
*H02K 1/14* (2006.01)
*H02K 3/24* (2006.01)

(52) U.S. Cl.
CPC ............... *H02K 9/19* (2013.01); *H02K 1/148* (2013.01); *H02K 3/24* (2013.01)

(58) Field of Classification Search
CPC .. H02K 1/20; H02K 3/24; H02K 9/19; H02K 2203/12
(Continued)

(56) References Cited

U.S. PATENT DOCUMENTS 8,188,625 B2    5/2012  Fukushima
2012/0175977 A1*  7/2012  Beatty ..................... H02K 3/24
310/58
(Continued)

FOREIGN PATENT DOCUMENTS

EP    1 630 930 A2    3/2006
EP    1 959 541 A2    8/2008
(Continued)

OTHER PUBLICATIONS

Extended European Search Report, Application No. 19858218.1, dated Aug. 11, 2021, 9 pages.

*Primary Examiner* — Quyen P Leung
*Assistant Examiner* — Minki Chang
(74) *Attorney, Agent, or Firm* — Foley & Lardner LLP

(57) ABSTRACT

Provided is a liquid cooling structure of a rotating electric machine, which is capable of suppressing the reduction of cooling efficiency even with a coil using a flat lead wire. Guide block walls 12Ac are provided on both sides in the width direction of a bobbin 12 along the axial direction of a stator 10 so as to position each between adjacent teeth portions 11b in the circumferential direction of a stator core 11 of the stator. A gap is formed between the coil 13 and the guide block wall 12Ac, and the guide block walls 12Ac are positioned adjacent to each other so as to make a closing between the guide block walls 12Ac of adjacent bobbins 12.

2 Claims, 4 Drawing Sheets

(58) Field of Classification Search
USPC .................................................. 310/54, 57
See application file for complete search history.

(56) References Cited

U.S. PATENT DOCUMENTS

| | | |
|---|---|---|
| 2014/0091651 A1 | 4/2014 | Dorfstatter et al. |
| 2014/0125167 A1* | 5/2014 | Marvin ................ H02K 15/045 |
| | | 310/64 |
| 2015/0028715 A1* | 1/2015 | Tsuiki .................... H02K 3/522 |
| | | 310/208 |

FOREIGN PATENT DOCUMENTS

| | | |
|---|---|---|
| EP | 2 159 906 A2 | 3/2010 |
| JP | 2004-40924 A | 2/2004 |
| JP | 2004-88944 A | 3/2004 |
| JP | 2010-57261 A | 3/2010 |

* cited by examiner

LIQUID COOLING STRUCTURE OF ROTATING ELECTRIC MACHINE

TECHNICAL FIELD

The present invention relates to a liquid cooling structure of a rotating electric machine, which cools coil of the stator of the rotating electric machine, such as motor or generator, with a cooling liquid.

BACKGROUND ART

As a liquid cooling structure of a rotating electric machine, which cools the stator of the rotating electric machine, such as motor or generator, with a cooling liquid, for example, there is one described in the following Patent Publication 1. In this structure, relative to a stator core in which plural divided stator cores each having a coil mounted thereon are arranged annularly in a circumferential direction of the rotor, oil discharging holes are arranged to face against between adjacent divided stator cores or between coils, and oil is discharged from the discharging holes toward therebetween along the axial direction of the rotor to cool the coils.

PRIOR ART PUBLICATIONS

Patent Publications

Patent Publication 1: JP Patent Application Publication 2010-057261

SUMMARY OF THE INVENTION

In the structure described in Patent Publication 1, the divided stator cores are respectively provided with insulators that project inwardly in the radial direction of a rotating electric machine, and a clearance at an inner side in a radial direction between adjacent divided stator cores is closed by the insulators, thereby forming an oil passage in the axial direction between adjacent divided stator cores and between the coils.

The oil passage formed in this manner easily can make different the number of windings on the inner side and that on the outer side in the radial direction of the rotating electric machine, if the coil is formed of a round lead wire having a circular cross section. Therefore, it is easily possible to make the oil passage between adjacent coils have a constant size in the radial direction of the rotating electric machine. In contrast, if the coil is formed of a flat lead wire having a rectangular cross section, it is difficult to make different the number of windings on the inner side and that on the outer side in the radial direction of the rotating electric machine. Therefore, there has been a risk that the oil passage between adjacent coils becomes larger as it goes from the inner side to the outer side in the radial direction of the rotating electric machine, thereby causing a waste of oil flow and reducing the cooling efficiency.

Therefore, it is an object of the present invention to provide a liquid cooling structure of a rotating electric machine, which is capable of suppressing the reduction of cooling efficiency even with a coil using a flat lead wire.

A liquid cooling structure of a rotating electric machine according to the present invention for solving the above-mentioned task is a liquid cooling structure of a rotating electric machine, for cooling coils by supplying a cooling liquid in an axial direction of a stator toward between adjacent teeth portions of the stator in which bobbins each having a coil mounted thereon are respectively attached to the teeth portions that are projectingly formed in a circumferential direction of an inner periphery of a yoke portion of an annular stator core, wherein guide block walls are provided on both sides in a width direction of the bobbin along the axial direction of the stator so as to position each between the adjacent teeth portions in a circumferential direction of the stator, wherein a gap is formed between the coil and the guide block wall, and wherein the guide block walls are positioned adjacent to each other so as to make a closing between the guide block walls of the adjacent bobbins.

Furthermore, a liquid cooling structure of a rotating electric machine according to the present invention is the above-mentioned liquid cooling structure of the rotating electric machine, wherein a surface of the guide block wall, which is positioned outside in the circumferential direction of the stator, is taperingly inclined such that a thickness of the guide block wall in the circumferential direction of the stator becomes thicker from an inner side toward an outer side in a radial direction of the stator.

Furthermore, a liquid cooling structure of a rotating electric machine according to the present invention is the above-mentioned liquid cooling structure of the rotating electric machine, wherein the coil is formed of a flat lead wire having a rectangular cross section.

In a liquid cooling structure of a rotating electric machine according to the present invention, the guide block walls of the bobbins are positioned adjacent to each other between the adjacent teeth portions in the circumferential direction of the stator to make a closing between the guide block walls. Therefore, most of the cooling liquid is allowed to flow into the gap between the coil and the guide block wall and flow therethrough while guided by the guide block wall, thereby entirely cooling the coils. With this, it is possible to effectively use the cooling liquid for cooling the coils without a waste flow of the cooling liquid and to greatly suppress lowering of the cooling efficiency.

MODE FOR IMPLEMENTING THE INVENTION

An embodiment of a liquid cooling structure of a rotating electric machine according to the present invention is explained with reference to the drawings, but the present invention is not limited to the following embodiment to be explained with reference to the drawings.

<Primary Embodiment>

Figure 1:
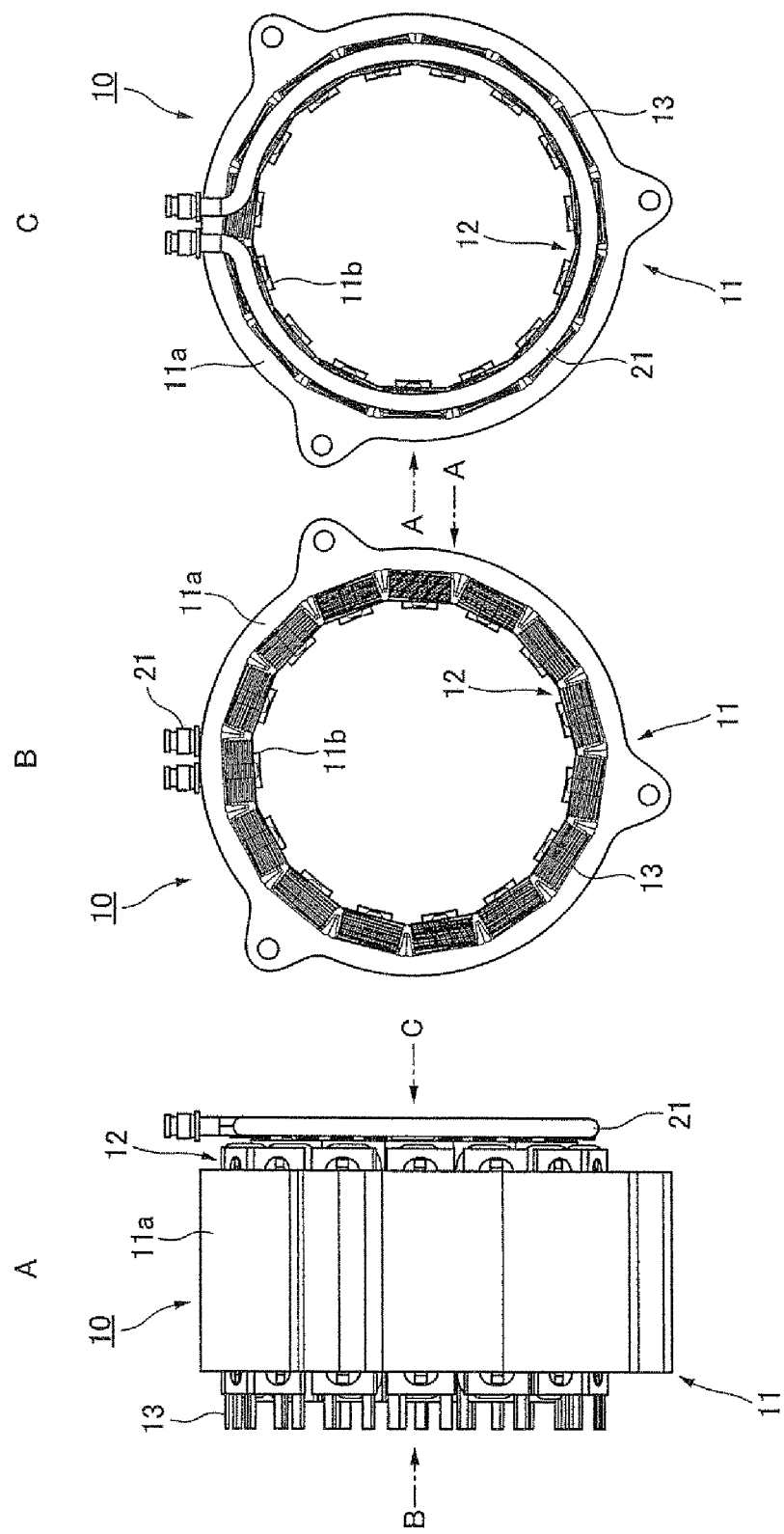
FIG. 1 is schematic views of a major part of a liquid cooling structure of a rotating electric machine according to the present invention, in which A is a side view, B is a view taken in the direction of arrow B in A, and C is a view taken in the direction of arrow C in A.

A primary embodiment of a liquid cooling structure of a rotating electric machine according to the present invention is explained with reference to FIGS. 1 to 4.

in FIG. 1, a stator is designated by 10, a stator core by 11, bobbins by 12, coils by 13, and a discharging tube by 21.

The stator 10 is one in which a plurality of the bobbins 12 each having the coil 13 mounted thereon are attached to an inner periphery of the annular stator core 11 along the circumferential direction. Its outer peripheral side is fixed to an inside of a casing, and a rotor is coaxially arranged on its inner peripheral side.

The stator core 11 is made of a magnetic material such as iron. It has an annular yoke portion 11a and a plurality of teeth portions 11b that are provided on the inner periphery of the yoke portion 11a along the circumferential direction and that project toward the inner side in the radial direction.

The bobbin 12 is made of an insulating material such as resin. It holds the coil 13 mounted thereon and is fit to the teeth portions 11b of the stator core 11 to be attached to the stator core 11.

Figure 2:
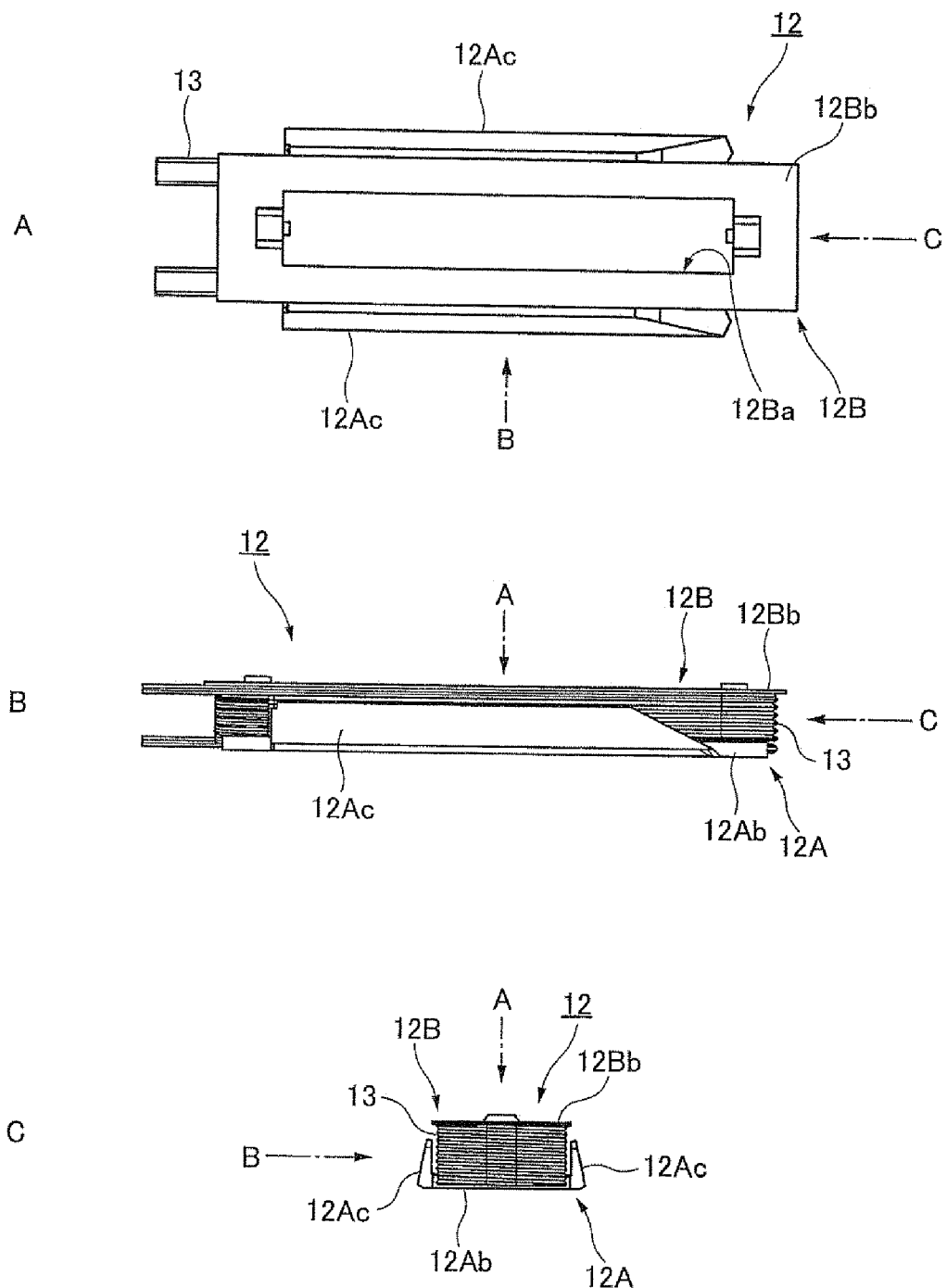
FIG. 2 is structural views showing the bobbin and the coil of FIG. 1, in which A is a plan view, B is a view taken in the direction of arrow B in A, and C is a view taken in the direction of arrow C in A.
Figure 3:
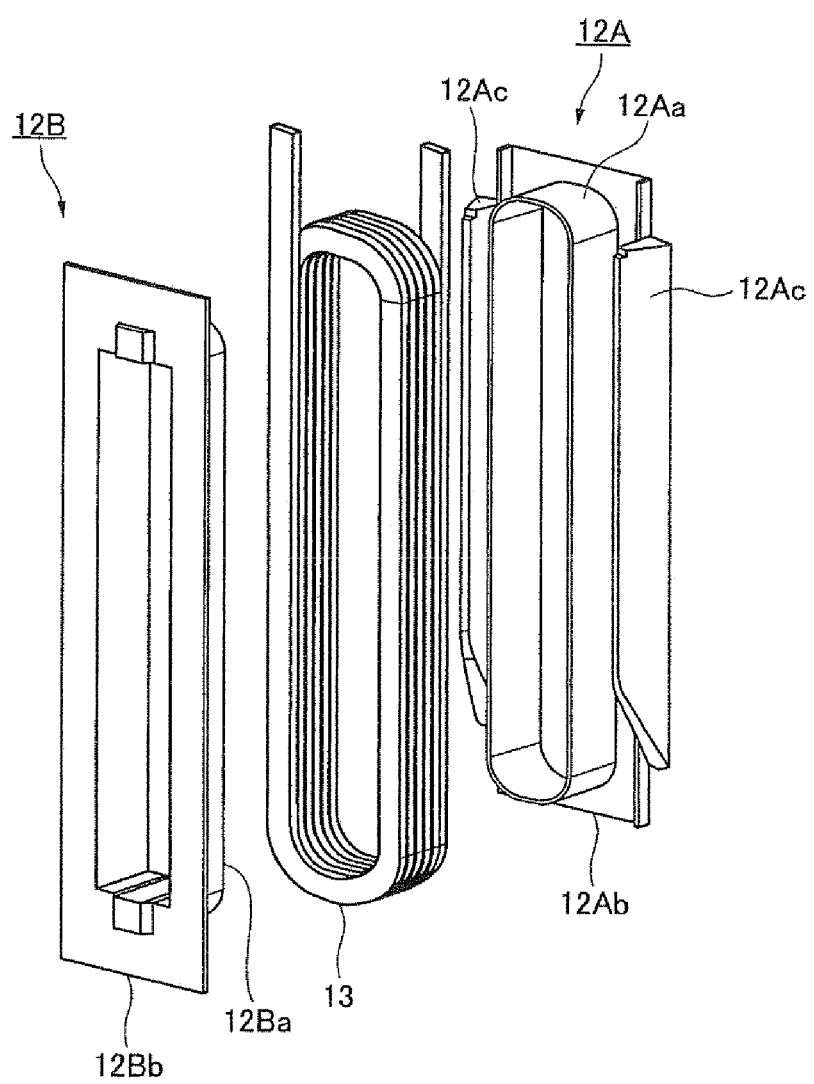
FIG. 3 is an exploded perspective view of the bobbin and the coil in FIG. 2.

As shown in FIGS. 2 and 3, the bobbin 12 is equipped with a bobbin body 12A having a mounting portion 12Aa that has an oval tubular shape for mounting the coil 13, and a rectangular flange portion 12Ab that is projectingly formed at a periphery of one end portion (end portion positioned outside in the radial direction of the stator core 11) of the mounting portion 12Aa toward the outside in the radial direction of the mounting portion 12Aa (directions to separate in the circumferential direction of the stator core 11) to cover the coil 13 mounted on the mounting portion 12Aa. Furthermore, it is equipped with a bobbin supplementary body 12B having an attachment portion 12Ba which has an oval tubular shape, of which inner surface side is fit to the teeth portions 11b of the stator core 11, and of which outer surface side is fit into the inner side of the mounting portion 12Aa of the bobbin body 12A; and a rectangular flange portion 12Bb which is projectingly formed at a periphery of an end portion of the attachment portion 12Ba on a side opposite to that fit to the mounting portion 12Aa (an end portion positioned inside in the radial direction of the stator core 11) toward the outside in the radial direction of the attachment portion 12Ba (directions to separate in the circumferential direction of the stator core 11) to cover the coil 13 mounted on the mounting portion 12Aa of the bobbin body 12A.

Furthermore, the bobbin 12 has guide block walls 12Ac that are provided on both sides in the width direction of the flange portion 12Ab of the bobbin body 12A (directions to separate in the circumferential direction of the stator core 11) along the longitudinal direction of the mounting portion 12Aa (the axial direction of the stator core 11) to project toward the side of the other end portion of the mounting portion 12Aa (the side of an end portion positioned inner side in the radial direction of the stator core 11).

In this guide block wall 12Ac, a surface outside in the width direction (short-length direction of the mounting portion 12Aa), which is a surface outside in the circumferential direction of the stator core 11, is taperingly inclined such that the thickness (length) in the width direction (short-length direction of the mounting portion 12Aa), which is the thickness in the circumferential direction of the stator core 11, becomes thicker (longer) from an inner side in the radial direction of the stator core 11, which is a tip end side on a side of an end portion projecting from the flange portion 12Ab (the other end side of the mounting portion 12Aa), toward an outer side in the radial direction of the stator core 11 on a base end side on a side of an end portion connected to the flange portion 12Ab (the one end side of the mounting portion 12Aa).

That is, when the attachment portion 12Ba of the bobbin 12 is inserted into each teeth portion 11b of the stator core 11 for its attachment, the guide block walls 12Ac of the bobbins 12 are respectively positioned between the adjacent teeth portions 11b in the circumferential direction of the stator core 11. With this, it turns into a shape that the guide block walls 12Ac can be positioned adjacent to each other to make a closing between the guide block walls 12Ac of the adjacent bobbins 12.

The coil 13 is formed of a flat lead wire having a rectangular cross section, is mounted on the mounting portion 12Aa of the bobbin 12, and is covered with the flange portions 12Ab, 12Bb. It is configured to form a gap of a constant distance between that and the guide block wall 12Ac in the circumferential direction of the stator core 11 (the short-length direction of the mounting portion 12Aa).

Figure 4:
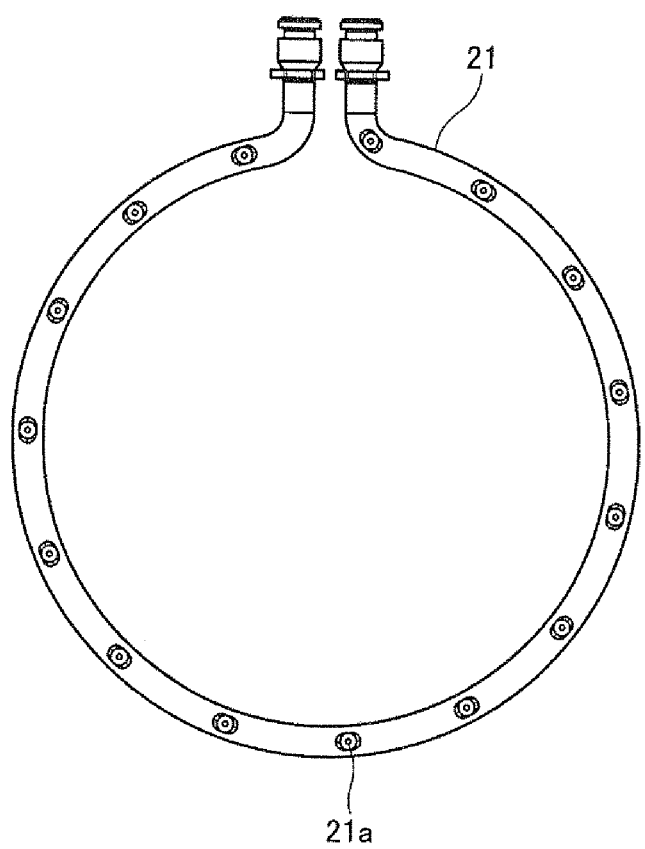
FIG. 4 is a schematic structural view of a discharging tube in FIG. 1.

As shown in FIGS. 1 and 4, the discharging tube 21 has an annular shape in a manner to connect adjacent teeth portions 11b in the circumferential direction of the stator core 11, is opposed to one end side of the stator core 11, and is formed with a plurality of nozzle holes 21a to discharge cooling liquid from one end side in the axial direction of the stator core 11 toward between adjacent teeth portions 11b along the axial direction of the stator core 11.

In the liquid cooling structure of the rotating electric machine according to the present embodiment, when the cooling liquid is supplied into the discharging tube 21, the cooling liquid is discharged from the nozzle holes 21a and is supplied to between adjacent coils 13 in the circumferential direction of the stator 10 from one end side in the axial direction of the stator 10.

Upon this, the guide block walls 12Ac of the bobbins 12 are positioned adjacent to each other between adjacent coils 13 in the circumferential direction of the stator 10 to make a closing between these guide block walls 12Ac. Therefore, most of the cooling liquid discharged from the nozzle holes 21a of the discharging tube 21 is allowed to flow into the gap of a constant distance between the coil 13 and the guide block wall 12Ac from one end side in the axial direction of the stator core 11 and flow therethrough toward the other end side in the axial direction of the stator core 11 while guided by the guide block wall 12Ac.

Because of this, most of the cooling liquid discharged from the nozzle holes 21a of the discharging tube 21 can be brought into contact with the coils 13 of the stator 10 to entirely cool the coils 13.

Therefore, according to the present embodiment, even with the coils 13 using a flat lead wire, it is possible to effectively use the cooling liquid discharged from the nozzle holes 21a of the discharging tube 21 for cooling the coils 13 without a waste flow of the cooling liquid. With this, it is possible to greatly suppress lowering of the cooling efficiency.

INDUSTRIAL APPLICABILITY

The liquid cooling structure of the rotating electric machine according to the present invention is capable of effectively using the cooling liquid for cooling the coils without a waste flow of the cooling liquid and capable of greatly suppressing lowering of the cooling efficiency. Therefore, it can be used extremely effectively in industry.

The invention claimed is:
1. A rotating electric machine with a liquid cooling structure for cooling coils of a stator thereof, the stator comprising:

an annular stator core having a yoke portion and teeth portions that are projectingly formed in a first circumferential direction of an inner periphery of the yoke portion;

bobbins that are respectively attached to the teeth portions; and coils that are respectively mounted on the bobbins, wherein the liquid cooling structure is configured to cool the coils by supplying a cooling liquid in an axial direction of the stator toward between adjacent teeth portions of the stator, wherein guide block walls are provided on both sides in a width direction of each of the bobbins along the axial direction of the stator so as to position each between the adjacent teeth portions in a second circumferential direction of the stator, wherein a gap is formed between each of the coils and each of the guide block walls, wherein the guide block walls are positioned adjacent to each other so as to make a closing between the guide block walls of adjacent bobbins, and wherein a surface of each of the guide block walls making the closing, which is positioned outside in the second circumferential direction of the stator, is taperingly inclined such that a thickness of each of the guide block walls in the second circumferential direction of the stator becomes thicker from an inner side toward an outer side in a radial direction of the stator.

2. The rotating electric machine as claimed in claim 1, wherein each of the coils is formed of a flat lead wire having a rectangular cross section.

\* \* \* \* \*